Figure 1:
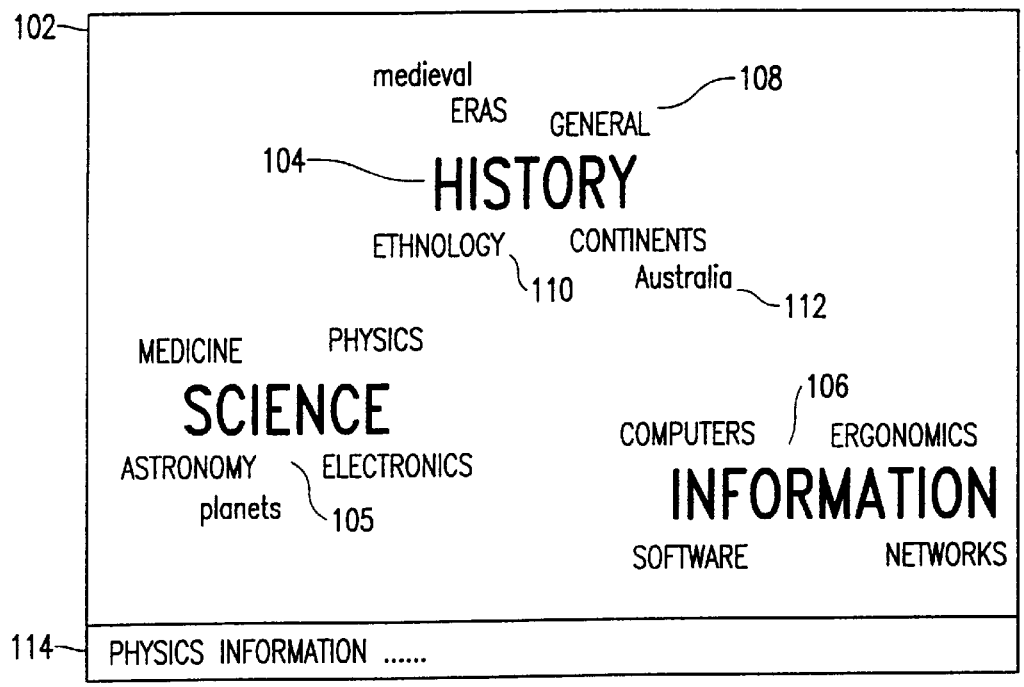

United States Patent [19]
Jorna et al.

[11] Patent Number: 6,029,172
[45] Date of Patent: Feb. 22, 2000

[54] METHOD AND SYSTEM FOR SELECTING AN INFORMATION ITEM

[75] Inventors: Gerardus C. Jorna; Mirjam S. Wouters, both of Eindhoven, Netherlands

[73] Assignee: U.S. Philips Corporation, New York, N.Y.

[21] Appl. No.: 08/914,445

[22] Filed: Aug. 19, 1997

[30] Foreign Application Priority Data

Aug. 28, 1996 [EP] European Pat. Off. .............. 96202385

[51] Int. Cl.$^7$ ...................................................... G06F 9/00
[52] U.S. Cl. ............................................................ 707/102
[58] Field of Search ........................................ 707/1–204

[56] References Cited

U.S. PATENT DOCUMENTS

| | | | |
|---|---|---|---|
| 5,737,595 | 4/1998 | Cohen et al. ............................ | 707/100 |
| 5,740,549 | 4/1998 | Reilly et al. ............................. | 705/14 |
| 5,845,265 | 12/1998 | Woolston ................................ | 705/37 |

OTHER PUBLICATIONS

"Visual Information Seeking: Tight Coupling of Dynamic Query Filters With Starfield Displays", CHI '94 Conference, Boston, MA, Apr., 1994.

*Primary Examiner*—Thomas G. Black
*Assistant Examiner*—John Gladstone Mills, III
*Attorney, Agent, or Firm*—Anne E. Barschall

[57] ABSTRACT

A computer system enables a user to browse a hierarchically classified database by interactively displaying a relevant portion of the classification scheme of the database as category names and sub-category names. After a user selects a displayed category (or sub-category), the system automatically modifies the displayed relevant portion of the classification scheme in a way that is dependent on the particular selected category. The modified portion of the classification scheme that is displayed includes not only the name of the user selected category and some of the names of sub-categories thereof, but also the names of some non-selected categories that are on the same hierarchy level as the selected category and are relevant to the selected category, as well as some of the names of sub-categories of these non-selected categories, thereby helping the user to find the name of a category or sub-category of interest without overwhelming the user with too many displayed names of categories and sub-categories.

9 Claims, 2 Drawing Sheets

METHOD AND SYSTEM FOR SELECTING AN INFORMATION ITEM

The invention relates to a method for enabling a user person to select a specific information item from a set of information items in an information processing system, the set of information items being organised in a classification scheme comprising a number of categories, at least two of those comprising a number of sub-categories, the method comprising the steps of:

displaying one or more of the categories, displaying one or more of the sub-categories, and offering the user the possibility to select one of the categories.

The invention further relates to a method for navigating in a database that comprises a plurality of categories which are organised in multiple trees, in that each lower level category is linked by a first link to a particular higher level category through an unconditional belonging property, and moreover various lower level categories are, external to their first link, linked by one or more second links to respectively associated other categories from at least the same level, through an associated parameterised relational property.

The invention further relates to a system for enabling a user person to select a specific information item from a set of information items in an information processing system, the set of information items being organised in a classification scheme comprising a number of categories, at least two of those comprising a number of sub-categories, the system comprising:

means for displaying one or more of the categories, means for displaying one or more of the sub-categories, and means for offering the user the possibility to select one of the categories.

Such a method is known from a library with a collection of information items like books, CDs and video tapes, where a user is given the opportunity to search a specific item in the collection. The information items are classified according to the SISO classification scheme and are placed in racks in the library hall in conformity with that scheme. In the known method, the user can select a certain category that appears of interest and in this category the user can select a sub-category. This selection process is repeated until the user reaches the lowest level of sub-category and subsequently selects a specific information from such a sub-category. The known method offers the user a stepwise refinement of the search to a specific information item using a pre-defined scheme of categories. This method has a drawback in that it is difficult to browse through the library collection, i.e. looking around in the collection without a specific search question in mind.

It is an object of the invention to provide a method of the kind set forth which offers an improved functionality for browsing through the set of information items compared to the known method. This object is achieved according to the invention in a method which is characterised in that the method further comprises the step of upon selection of a category displaying non-selected categories and/or sub-categories of non-selected categories in dependence on the respective relevance of said categories or sub-categories for the selected category. In the method according to the invention, a sub-category of a non-selected category is only displayed if it is relevant enough in view of the category selected by the user. This method therefore allows the display of relevant sub-categories of other categories than the selected one as well, whereas the known system only displays the sub-categories of the selected category. The method according to the invention in this way informs the user of the availability of sub-categories of interest, other than the ones under the selected category. The method offers the user the full width of the entries in the classification scheme, whereas the known method focuses in a particular direction thereby impeding a choice in another direction. The method according to the invention realises this by customising the scheme in response to the selection of the user. The method encourages the user to deviate from the original direction as specified by the selection and to browse around the set of information items through selection of a sub-category of a non-selected, though related, category. In the method according to the invention, the process of selecting a category or sub-category and subsequently modifying the organisation of categories is repeated, while the user further descends down the hierarchy towards the individual information items. Alternatively to, or in addition to, the above mechanism, the classification scheme is adapted to the selection of the user by displaying the non-selected categories in a way that is dependent on that selection. This allows the display of non-selected categories that are related to the selected category in a way that makes them easier to select than less related categories.

An embodiment of the method according to the invention is characterised in that the categories and sub-categories are displayed in a virtual space, the categories being displayed in a first manner to appear in a first layer of the space and the sub-categories being displayed in a from the first manner distinguishable, second manner to appear in a second layer of the space. The presentation of categories and sub-categories as objects in a virtual space provides a useful, usable and enjoyable mechanism for presenting the user the context of the current category. The categories and sub-categories are presented in a spatial relation to one another which resembles the well known and familiar organisation of object in a real world.

An embodiment of the method according to the invention is characterised in that the method comprises the steps of:

displaying the selected category on a prominent position of a display screen, and displaying the non-selected categories next to the selected category in a relative proximity favoured by the respective relevance of said non-selected categories for the selected category. Presenting the selected category on a prominent position of the screen, e.g. in the centre of the screen, and the non-selected categories in a proximity that is related to their respective relevance with respect to the selected category, further helps in maintaining the context for the user. Furthermore, by displaying more related categories closer to the selected category the user is further encouraged to deviate from its original direction and to try another direction. This will help the user in finding an information of interest in an category which originally appeared less interesting.

An embodiment of the method according to the invention is characterised in that the method comprises the step of displaying the sub-categories of non-selected categories next to the selected category in a relative proximity favoured by the respective relevance of said sub-categories for the selected category. By displaying sub-categories related to the selected category, though belonging to a different category, closer to the selected category if they are more related supports easier browsing through the set of information items.

An embodiment of the method according to the invention is characterised in that the user is offered a further possibility to select a further category or a sub-category and that a log of bookmarks is maintained of the sequence of selections made by the user. By maintaining a list of the selections, the user is given the option to return to a point in the hierarchy which has been earlier visited.

It is a further object of the invention to provide a method for navigating in a database that comprises a plurality of categories which are organised in multiple trees, in that each lower level category is linked by a first link to a particular higher level category through an unconditional belonging property, and moreover various lower level categories are, external to their first link, linked by one or more second links to respectively associated other categories from at least the same level, through an associated parameterised relational property, said method comprising:

in a virtual space prominently presenting various top level categories in a relatively spatial arrangement, together with less prominently presenting various lower level categories that are linked to said top level categories through respective said first links, and are arranged in relative proximity according to said first links, upon user selection of a particular displayed category, enhancing prominence of the so selected category, together with less prominently presenting various lower level categories that are linked to said selected category through respective said first links, and are arranged in relative proximity according to said first links, whilst selectively also less prominently presenting various other categories that are directly or indirectly linked to said selected category through respective said second links which fulfil an associated parameter threshold condition, and are arranged in relative proximity according to an associated parameter value, upon user selection of a particular lowest level category, presenting an associated list of items belonging to the latter category for further selection thereof. By offering a method for navigating through a database during which the links between categories are used for presenting the categories in favour of a further selection, the user is supported in finding an information item of interest. The choice of categories and the way they are presented to the user is dependent on selections made by the user therefore conform to the area of interest, expressed by the selections. The prominent position of the currently selected category and the position of relevant (sub-)categories in its proximity in relation to their relevance contribute to a presentation that enhances the browsing functionality offered to the user.

It is a further object of the invention to provide a system of the kind set forth with an improved functionality for browsing through the set of information items compared to the known system. This object is achieved according to the invention in a system which is characterised in that the system further comprises means for upon selection of a category displaying non-selected categories and/or sub-categories of non-selected categories in dependence on the respective relevance of said categories or sub-categories for the selected category. By ascertaining the relevance of sub-categories with respect to the selected category and by only displaying sub-categories which are relevant enough, the system is able to present the classification scheme in a way that invites the user to browse through the set of information items. The thus presented scheme comprises the possibility for a broad further selection by the user, while maintaining the number of categories displayed within limits so as not to overwhelm the user with too many choices. The system has the possibility to adapt the presentation of the classification scheme by displaying the non-selected categories in a way which is dependent on the selected category. This allows an easier further selection of a category that is related to the selected category.

An embodiment of the system according to the invention is characterised that the means for displaying the categories and the means for displaying the sub-categories are arranged to display the categories and sub-categories in a virtual space on a display screen, the categories being displayed in a first manner to appear in a first layer of the space and the sub-categories being displayed in a from the first manner distinguishable, second manner to appear in a second layer of the space. Presenting the categories of the classification scheme as objects in a virtual space maintains a context for the user while browsing through the scheme.

Further advantageous embodiments of the method and the system according to the invention are recited in the dependent claims.

It is known as such, to display the results of a selection step in a method for selecting a specific information, as interrelated objects on a screen. The article "Visual Information Seeking: Tight Coupling of Dynamic Query Filters with Starfield Displays", CHI '94 Conference, Boston, Mass., USA, April 1994, describes a method for selecting a film from a large set of films. In that method, the search query is entered by means of sliders, allowing the entry of parameters like length, director, actor, and ratings. The films matching the entered parameters are displayed as objects in a co-ordinate system with an X-axis and a Y-axis, which allow the resulting films to be distributed over the display screen with respect to further parameters, like year of production, type of film and popularity. The known method has a first type of objects for specifying the query, namely sliders and the like in a dedicated entry screen, and a second type of objects for displaying the results from the query, namely squares in the display field. The purpose of the known method is to simultaneously show the particular query and its results. The purpose of the method according to the invention is to offer a classification scheme with multiple levels of categories for helping the user in selecting an information item. The objects displayed on the screen according to the invention are in general not information items but categories forming the classification scheme. In the invention, the user does not specify a query but makes steps in the classification scheme which bring him to potentially interesting information items. As a result of a step of the user, the system according to the invention updates the classification scheme and displays the resulting scheme on the screen. A summary of the differences the invention has compared to the known method:

usage of multiple level classification scheme, display of objects forming the scheme instead of display of matching information items, stepwise wandering through the scheme instead of specification of query, input, i.e. selection of category, in the same display field as display of result, i.e. display of updated scheme.

Figure 2:
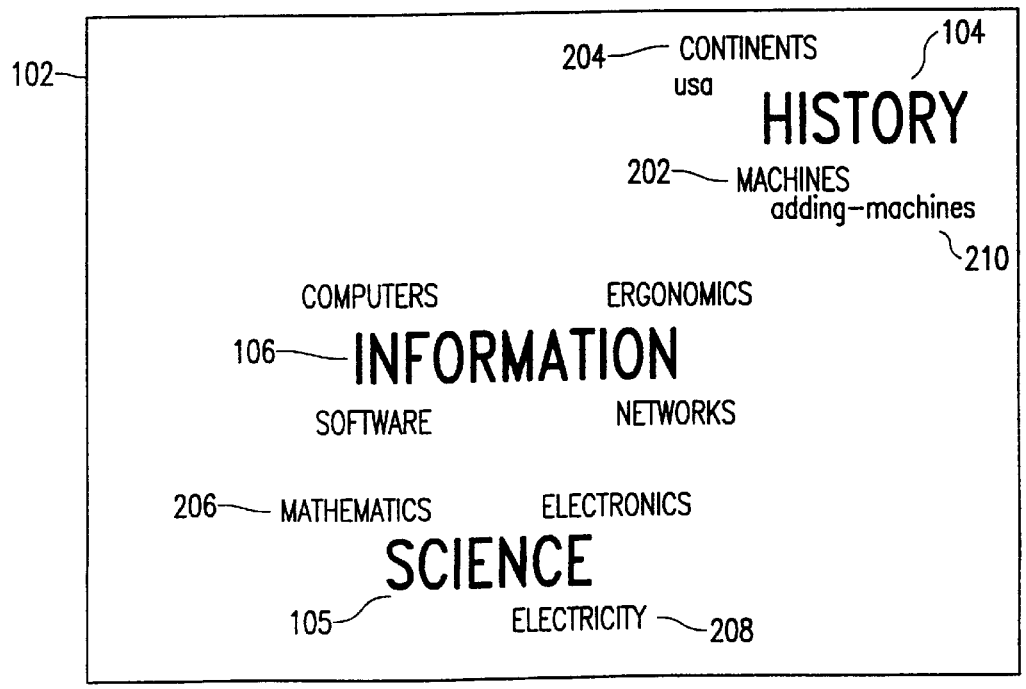
Figure 3:
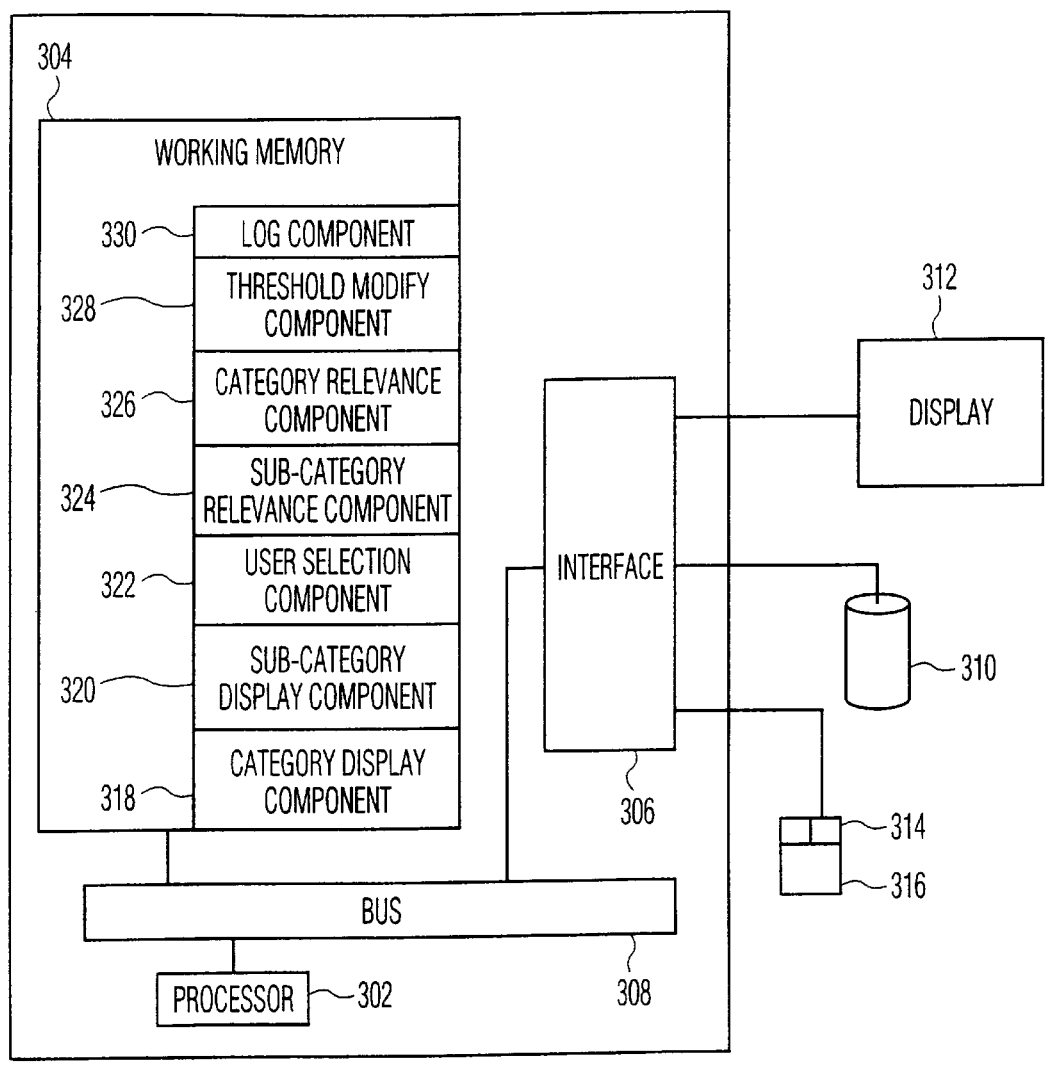

The invention and its attendant advantages will be further elucidated with the aid of exemplary embodiments and the accompanying schematic drawings whereby:

FIG. 1 contains an example of a display screen with categories shown according to the invention, FIG. 2 shows the display screen after selection of a particular category, and FIG. 3 schematically shows the most important components of the system according to the invention.

FIG. 1 contains an example of a display screen with categories shown according to the invention. The word category is used throughout this document for both the concept category, i.e. a class of objects of like kind, and the identification of the category, i.e. its name as appearing on a screen. In the invention a classification scheme is used comprising a hierarchy of categories and sub-categories. This can be the SISO scheme, used in many libraries to classify books and the like, but the invention is not restricted to this particular scheme. A sub-category at one level will be a category at the next level down, comprising various sub-categories. In the invention the classification scheme is presented as a space with a number of layers starting from a first layer in front. A layer represents a certain level in the hierarchy of the classification scheme and contains categories belonging to that level. The front layer represents the highest level and contains main categories, the second layer represents the next layer down, and so on, whereby the last layer at the back represent the individual information items as contained in the lowest sub-categories. Categories belonging to a certain level are displayed in the corresponding layer in a certain manner that distinguishes them from categories in other layers. This is done by using a particular size of characters identifying a category, a particular font of characters, style of characters, sharpness of characters, colour of characters, or a combination of the previous characteristics. In particular the size of characters helps in creating the sensation that the different layers are lying behind one another. A display screen 102 shows a number of main categories from the highest level of the hierarchy, e.g. categories 104, 105 and 106, on a first layer. The display screen 102 also shows a number of categories of the next level down in the hierarchy, e.g. categories 108 and 110 which are sub-categories belonging to category 104. Furthermore, categories of a further level down can be shown, e.g. category 112. The actual number of categories showed is controlled, in a way that is described below, so as to avoid cluttering of the display which would make it difficult or impossible to see categories at the lower levels.

FIG. 2 shows the display screen after selection of a particular category. When the user enters the system of the invention, the categories of the classification scheme move from a virtual horizon to their initial positions in the respective layers of the virtual space. This provides the user with a 'neutral' starting position for consulting the catalogue of information items. When the user selects a particular category, the presentation of the scheme is modified. Based on the particular selected category, the system ascertains the relevance of other categories of the scheme. These can be categories at the same level as the selected category or categories at another level. The implementation of the feature to ascertain the relevance can be in different ways. It is possible to define in advance for the categories of the scheme how relevant they are to other categories. This could be restricted to define the relevance of a category for the main categories or other higher categories in the scheme. If a particular category is selected, the pre-defined relevance value of another category for this particular category then becomes an actual value that can be used by the system. The SISO system, used in many libraries, allows this kind of definition of cross relevance between categories. Another possibility to implement the ascertaining function is to define a set of parameters for every category and to assign a value to each of the parameters to characterise the category. The ascertaining function then comes down to calculating a value representing the similarity between two categories based on the values of corresponding parameters. When two categories have none or few parameters in common, they are not or weakly related to each other. When categories have many parameters in common, they are more related to each other. A high value for matching parameters indicates a still stronger relationship. A still further implementation of ascertaining the relevance of one category to another would be to use artificial intelligent techniques like fuzzy logic or neural networks, or to use an agent program to ascertain the relevance. After selection of category 106, the relevance of the sub-categories of the non-selected categories 104 and 105 is ascertained in view of the selected category. For category 104 a sub-category 202 which was initially not shown, is added since it appears relevant to the selected category 106. In the classification scheme, sub-category 202 had been defined as a sub-category of category 104 but its display was suppressed in FIG. 1 to avoid too many categories on the screen. The system has a certain threshold and a category must have a relevance factor higher than that threshold in order to be displayed. Because of the selection of category 106 and the relatively high relevance of sub-category 202 for this category 106, its value has been increased and is now above the threshold. Sub-category 204 was already displayed in FIG. 1 and is still displayed, now based on its new ascertained relevance factor. Two further sub-categories of category 104, which were previously shown, are now suppressed because of the selection of category 106. Also for category 105 two new sub-categories 206 and 208 are now displayed, while they were previously suppressed. These sub-categories appear of interest to the user, because of his selection of category 106. Also lower level categories can be viewed so relevant to the selected category that they will be displayed, e.g. category 210, which is a sub-category to category 202, is now displayed.

The initial display of the categories is a general, neutral starting representation of a part of the classification scheme. The main categories, their major sub-categories, and still further lower sub-categories are displayed and offered for selection by the user. When the user makes a selection, the presentation of the classification is modified with the aim to better conform to the user's interest, which is reflected by the selection made. So after selecting a particular category, the other categories of that level are not blocked or moved away but the user is still offered the possibility to select a (sub-)category from another category. In order to keep the number of options in limit to not overwhelm the user, only those (sub-)categories that appear relevant are displayed. By keeping the possibility open to select from other categories, the user is invited to explore the contents of the collection which gives the opportunity of finding an interesting information item from an unexpected source.

In addition to modifying the representation of the classification scheme with respect to the selective display of certain categories, the positions at which the respective categories are displayed are changed with respect to the selected category. The selected category 106 is displayed at a prominent position in its layer of the display screen. This visualises the last selection made by the user. The prominent position can be in or near the centre of the display screen, further depending on possible other display screens shown on the same display device. The other categories, whether on the same level or on a lower level, are positioned at a distance from the selected category which is dependent on the relevance of the particular category to the selected category. This relevance is ascertained as described above. The result is a presentation of the classification scheme with the selected category in a central position and with related categories, potentially of interest to the user, grouped around it. This grouping further encourages the user to consult categories and information belonging to other categories than the one he had selected. Independent of their position on the screen, a category remains in its layer corresponding to its level in the hierarchy so that the user keeps the overview of the hierarchy. Even when the user descends down the hierarchy, representatives of every layer remain present thus maintaining the context for the user browsing through the set of information items. The presentation of the hierarchy of categories as a virtual space is a user-friendly and appealing mechanism to keep the user informed about his position. This presentation resembles the well known organisation of objects in the real world. A further mechanism to keep the user informed about his position and in particular how he arrived there, is the keeping of a log list of the past selections. Such a list can be presented as a linear list 114 on the display screen. The mechanism of changing the position of the selected category and of relocating the respective categories and sub-categories can also be used without the mechanism of suppressing or substituting sub-categories.

Whether or not a particular category is displayed depends on its relevance factor compared to a threshold maintained by the system. An enhancement of the system is to offer the user the option of modifying the value of this threshold. This gives the user control over the number of categories actually displayed on the screen and a lower threshold further widens the browsing options. Then the categories positioned far away from the selected category are less strongly related but still may be of interest to the user who desires such a broad presentation.

FIG. 3 schematically shows the most important components of the system according to the invention. The system is implemented according to known architecture and can be realised on a general purpose computer. The system has a processor 302 for carrying out instructions of an application program loaded into working memory 304. The system further has an interface 306 for communication with peripheral devices. There is a bus 308 for exchange of commands and data between the various components of the system. The peripherals of the system include a storage medium 310 containing the executable programs, the set of information items, the classification scheme and various other data. The storage medium 310 can be realised as various separate devices, potentially of different kind of storage device. Application of the invention is not restricted by the type of device and storage devices which can be used include optical disc, magnetic disc, tape, chip card, solid state or some combination of these devices. Furthermore, some of the data may be at a remote location and the system may be connected to such a location by a network. The peripherals of the system further include a display 312 on which the system displays, amongst others, the display screen with the various categories. Furthermore the peripherals include a selection device 314 and a pointing device 316 with which the user can move a cursor on the display. Devices 314 and 316 can be integrated into one device like a computer mouse with one or more selection buttons. However, other pointing devices like a track ball, graphic tablet, joystick, or touch sensitive display are also possible. In order to carry out the various tasks, a number of software components are loaded into working memory 304 when they are required. These include component 318 for displaying categories, component 320 for displaying sub-categories, component 322 for offering the user a selection among the categories or sub-categories, component 324 for ascertaining the relevance of a sub-category with respect to a selected category, component 326 for ascertaining the relevance of a category with respect to a selected category, component 328 for offering the user the option to modify the threshold for displaying categories, and component 330 for maintaining a log of bookmarks concerning the selections of the user. Some of these components could be combined to form a larger component for carrying out a set of tasks, while others could be split when this seems feasible.

Below a description is given of the library environment in which the invention is applied as browse tool to explore the library's catalogue. The browse tool and its relations to the other tools are described.

1. Value and Services Translated into Tools

Users perform various activities in different parts of the library. The places where those activities are performed are linked to where the various parts of the library's collection are located around the building. Access to the library catalogue and the services is through a range of tools designed to support the particular ways a user will want to use the library. So different needs are served by different tools, but at the same time the tools form a coherent whole. As a user goes from one tool to another he or she is not confronted with completely different devices. What users learn using one tool helps them to use another. The tools are also inter-linked. When information is entered into one tool, it is recognised by the whole system. The user does not have to repeatedly enter the same information.

The concept of the this library builds on the concept that the interior and the tools are interdependent since the context in which the tools are used will influence user attitudes to the technologies. There is provided a framework for blending the technology into the fabric of the interior; it simply becomes part of the furniture. This theme of interdependence starts with the entrance area of the library, where the Infowall and other tools are located, and continues as users go on to use the various tools in other parts of the library. This may involve the use of the info-table, the browse zone, the 'fast-track' area, all of which are in the places where the user needs them. The following concepts and tools enhance the library process:

The Street

Users will be able to return books and other borrowed items without entering the library itself. There will also be an information point providing information about the library's services and facilities.

The Entrance

People may first come into contact with the library in the town centre, then in the street near the library building, and finally within the building itself. The entrance hall is the focus of all library activities. All the services and tools are accessible from this point. Visitors are invited to enter and are shown all kinds of information in the entrance hall.

When users return items, they can classify them as:

recommended to other users to be added to their personal profile a normal return.

Items classified as 'Recommended to other users' are added to the recommendation lists of those who are interested in that subject. Information about items classified as 'To be added to personal profile' may be accessed by the user for later reference. Other items that are returned will just be returned without further processing.

The Smart Card

The Smart card contains information relating to the users particular areas of interest and acts as a key to all the tools and services within the library. By storing personal profiles and a transaction history on a Smart card the system can link individual preferences with categories of interest and connect this with others who have the same interest. It also helps the library staff to be more responsive in advising library users. It also enables library users to advise each other.

The Smart card may also help to identify people with similar interests. For example accessing 'special interest groups' may reveal that there is:

a list of recommended books for the local angling club, new sources of information about Greece (videos, books, songs on CD) are displayed in the Travel section a print-out can be obtained of when and where the classic motorbike club of Eindhoven will meet next.

The Infowall

A wall that displays information in a dynamic, attractive and entertaining way. Users can just watch and listen but can also interact with it to get at the information they want. It can be used to display information about special events, recent additions to the catalogue, particular topics that the library wants to advertise and so on. It could be located in different positions within the library itself, but also in other parts of the city.

The Fast-track

An interface to the catalogue designed to enable those who know just what they want to rapidly identify whether the library has a copy, where it is, and even make a reservation.

The Search

Extending the use of hyper link technology to help users find specific tems related to the subject of interest. More suitable for the user than the Fast-track when the user does not know exactly what they want The Browse Innovative hyper link technology that enable users to explore the catalogue in ways which reflect their own interests. A key feature is that users are prompted to explore areas of the catalogue which they might otherwise never known existed.

The Library Guide

An interactive guide that provides information about the specific services the library has to offer, how to make use of them, where they are located and how to get there. It also tells the user who they need to see for help The Smart card; Recommend—Advice—Participate, By storing personal profiles and a transaction history on a Smart card the system can link individual preferences with categories of interest and connect this with others who have the same interest. It also helps the library staff to be more responsive in advising library users. It also enables library users to advise each other.

The Info Island

Special locations within the library where users can get access to the basic set of tools; Fast-track, Search, and Browse.

The Profile Link

Mark, aged 24. Interested in football, motorbikes, and travel to Italy. Has just read a book on Rome and wants to know more about Milan. He accesses 'Recommendations'. Edwin, aged 26. Interested in swimming, AC Milan, girls, and movies. Edwin has borrowed many items from the library. He checks 'Latest items of interest'. The books that Edwin has read about football and the videos of AC Milan he has borrowed are recommended to Mark.

The Reading Table

A pleasant and familiar place in the library provide access to user groups, internet, digital magazines and newspapers, and e-mail. Angelique, waiting for her children to find what they want, sits down at the Reading Table. She browses through today's Wall Street Journal and orders tickets for tomorrow's musical at the local theatre.

Fast track, Searching, Browsing Within the Library

"Fast-track" is the process in which regular users move directly to the places where items of their interest are located. The users are familiar with the library, its layout and the method the library uses to organise its collection. In addition, they are familiar with searching on the electronic catalogue. Important to them is quick access to the collection, a versatile input device for alphanumeric entry, the main methods of searching, and instant feedback on whether or not the requested information is available."Take along" information of where to go to obtain the information is also important. Additional functionality, more than within the Fast track, for filtering and information retrieval needs to be available within the search tool. In addition, searching within different domains need to be available as well as feedback of the overall structure within the library. Dynamic query filters, direct coupling of input-output relationships, and a visual overview of results are almost a must.

A new browsing environment should be inviting, interesting and stimulate users to continue to discover and learn. Data within the browsing interface needs to be organised according to appropriate data types and visually displayed using organisational structures that are linked to the tasks and familiar to the user. Easy access to the browsing tool and representative visualisation and manipulation of the data is a must. A browsing application needs to display where the user is positioned, provide an overview of what is available, possible actions, and display reference to how to return to the starting state. In addition, the use of dynamic query filters, direct coupling of input-output relationships, and a visual overview of results should be investigated with regard to their ease of use.

The personal space for reviewing should enable the user to optimally match and compare his defined interests and needs with the obtained information. In addition, it should provide easy access to the developed fast track, search, and browse tools.

2. The Fast-track

Within the Fast-track, the user takes immediate control of the collection by typing in his request. The word being typed is displayed on the interface in front of the user. Immediate feedback is presented to the typed word, then the user can specify if he wants to filter the output by title, subject, or author or by one of the main categories used by the library to classify their items. The library's collection of the library is visualised as a series of lists structured according to the category classification used by the library e.g. the SISO-register. This is referred to as the Systematic View option. It provides a complete overview of the library database. The organisation of the content of the library collection is immediately displayed to the user. When a category is accessed for selection, sub-categories of the category are displayed to provide more information to the user on what the category "means". In addition, the attributes of selected items are displayed in the item panel along side the list of categories (e.g. title, author, date, medium, genre, content excerpt, and so on). The item panel also provides information about the status of the selected item (if it is in the library and available) and its physical location. As adjustments are made to the category selected the item list will change accordingly. Entries can also be made in the item panel which in turn can change what is displayed in the category lists. This means that user's can easily their inquiries. User's also gain a quick impression of how the catalogue is structured.

3. The Search Tool

The Search tool combines the 'Browse' and the 'Fast-track' in one 20 integrated tool. The Search tool also adds facilities which extend the search capabilities of the 'Fast-track'. Consequently user's have the advantage of using either. During an exploration of the information space they may switch view at any time enabling the user to inspect a selected item from either an associative or systematic angle. Extra facilities include the History scroller control. This provides a log of user actions providing the user with an overview of selections made and allowing the user to return to a particular sequence.

The view control contains a number of important options that control the display of information within the information space. The information space is filtered to display items that have a set amount of coherence with a selected interest profile. The user can vary the amount of filtering and thus control the number of items displayed. The user can mark information items. The bookmark gives access to all the markers placed during an session and allows the user to jump to a specific bookmark to continue the session from that point.

4. The Browse Tool

When users enter the browse view they are presented in 3D space with the categories used within the library. The user can 'move into this space', point to a category and select it. The selected category then moves to the centre of view and other categories that are related to the selected category are shown in the space nearby. Presenting the categories in this way always maintains a context for the user. The category selected is always shown in relation to other categories associated with it. These categories may be at different levels in the overall hierarchy of categories.

The user can then go onto select another category. This new category then moves to the centre of view. As this occurs, categories which are no longer so relevant are removed and other categories which are now relevant are introduced. At any time users can access the specific items within the selected category. But they can also continue to 'wander through' the catalogue as they wish. As the user progresses the sequence of categories selected is shown below at the bottom of the display. The user can choose the number of items and the speed at which they are presented, and using the filters located on the bottom of the window, the user can select the strength of the relationships between items shown.

The user first identifies himself to the system by inserting his smart card into the reader. The system then fills the layers in the browse area with items from the SISO system. The items move from their 'host' label on the horizon toward the user and locate themselves one of the layers. Items out of sight can be brought into view by changing the threshold values of the items which match the selected profile or by navigating through the space by panning, zooming in or squeezing the layers closer together. Selecting an item in this space may change the content of the space. Depending on the layer in which the item is positioned, a description and related subjects may be provided as extra information. Items on the fifth layer contain specific information such as name of the author, title, media-type etc.

Imagine Joe, a library user of the future, using this interface . . . .

By pointing at items on the last layer Joe is shown a quick preview of what he can expect from these books, video's and CD Roms. Because Joe didn't select any of the items he did not change the content of the other four layers. Two books, one by an archaeologist the other by an anthropologist, and a BBC video appear to be pretty exiting. The item panel informs him that both books are present in the library but the video is lent out. He reserves the books by 'dragging' them into the shopping basket. He also makes a reservation for the video. The road map keeps track of his steps using book marks. This means that he can later return to places that he has left unexplored during his browsing journey. The book marks will enable him to return to interesting places during his next visit.

I claim:

1. A method for enabling a user to select a specific information item from a set of information items in an information processing system, the set of information items being organised in a classification scheme comprising a number of categories, at least two of those categories comprising a number of sub-categories, each of the categories and sub-categories having a descriptive name, the method comprising the steps of:

displaying the names of one or more of the categories, displaying the names of one or more of the sub-categories, and offering the user the possibility of selecting one of the categories, characterised in that the method further comprises the step of:

upon selection of a category by the user, displaying the names of non-selected categories and/or sub-categories of non-selected categories in dependence on the respective relevance of said categories or sub-categories to the selected category, upon user selection of a particular displayed category, enhancin(g prominence of the name of the selected category, together with less prominently presenting the names of various lower level categories that are linked to said selected category.

2. A method as claimed in claim 1, characterised in that the names of the categories and sub-categories are displayed in a virtual space, the virtual space having first and second layers, the names of categories being displayed in a first manner to appear as the first layer of the virtual space and the names of sub-categories being displayed in a second manner visually distinguishable from the first manner to appear as the second layer of the space.

3. A method as claimed in claim 2, characterised in that the virtual space comprises five layers, the four layers in front representing subsequent levels of the classification scheme and the layer at the back representing the set of information items.

4. A method as claimed in claim 1, characterised in that the method comprises the steps of:

displaying the name of the selected category at a prominent position on the display screen, and displaying the names of the non-selected categories next to the name of the selected category at a relative proximity determined by the respective relevance of said non-selected categories with respect to the selected category.

5. A method as claimed in claim 1, characterised in that the method comprises the step of:

displaying the names of the sub-categories of non-selected categories next to the name of the selected category at a relative proximity determined by the respective relevance of said sub-categories with respect to the selected category.

6. A method as claimed in claim 1, characterised in that only the names of sub-categories are displayed which have been determined to have a relevance with respect to the selected category that is above a predetermined threshold.

7. A method as claimed in claim 6, characterised in that the user is offered the option of modifying the predetermined threshold in order to modify the number of displayed names of sub-categories.

8. A method as claimed in claim 1, characterised in that the user is offered a further possibility of selecting a further category or a sub-category and that a log of bookmarks is maintained of the sequence of selections made by the user.

9. A method for navigating in a database that comprises a plurality of categories which are organised in multiple trees, in that each lower level category is linked by a first link to a particular higher level category through an unconditional belonging property, and moreover various lower level categories are, external to their first link, linked by one or more second links to respective associated other categories at the same level, through an associated parameterised relational property, each of the categories having a descriptive name, said method comprising:

in a virtual space prominently presenting the names of various top level categories in a relative spatial arrangement, together with less prominently presenting the names of various lower level categories that are linked to said top level categories through respective ones of said first links, and are arranged in relative proximity according to said first links, upon user selection of a particular displayed category, enhancing prominence of the name of the selected category, together with less prominently presenting the names of various lower level categories that are linked to said selected category through respective one of said first links, and are arranged in relative proximity according to said first links, whilst selectively also less prominently presenting the names of various other categories that are directly or indirectly linked to said selected category through respective ones of said second links which fulfil an associated parameter threshold condition, and are arranged in relative proximity according to an associated parameter value, upon user selection of a particular lowest level category, presenting an associated list of items belonging to said particular lowest level category for further selection thereof.

\* \* \* \* \*